J. B. MILLER.
MACHINE FOR CUTTING OR SLICING FOOD PRODUCTS.
APPLICATION FILED MAY 31, 1918.

1,296,102.

Patented Mar. 4, 1919.
2 SHEETS—SHEET 1.

Inventor
John B. Miller
By C. L. Parker
Attorney

J. B. MILLER.
MACHINE FOR CUTTING OR SLICING FOOD PRODUCTS.
APPLICATION FILED MAY 31, 1918.
1,296,102.
Patented Mar. 4, 1919.
2 SHEETS—SHEET 2.
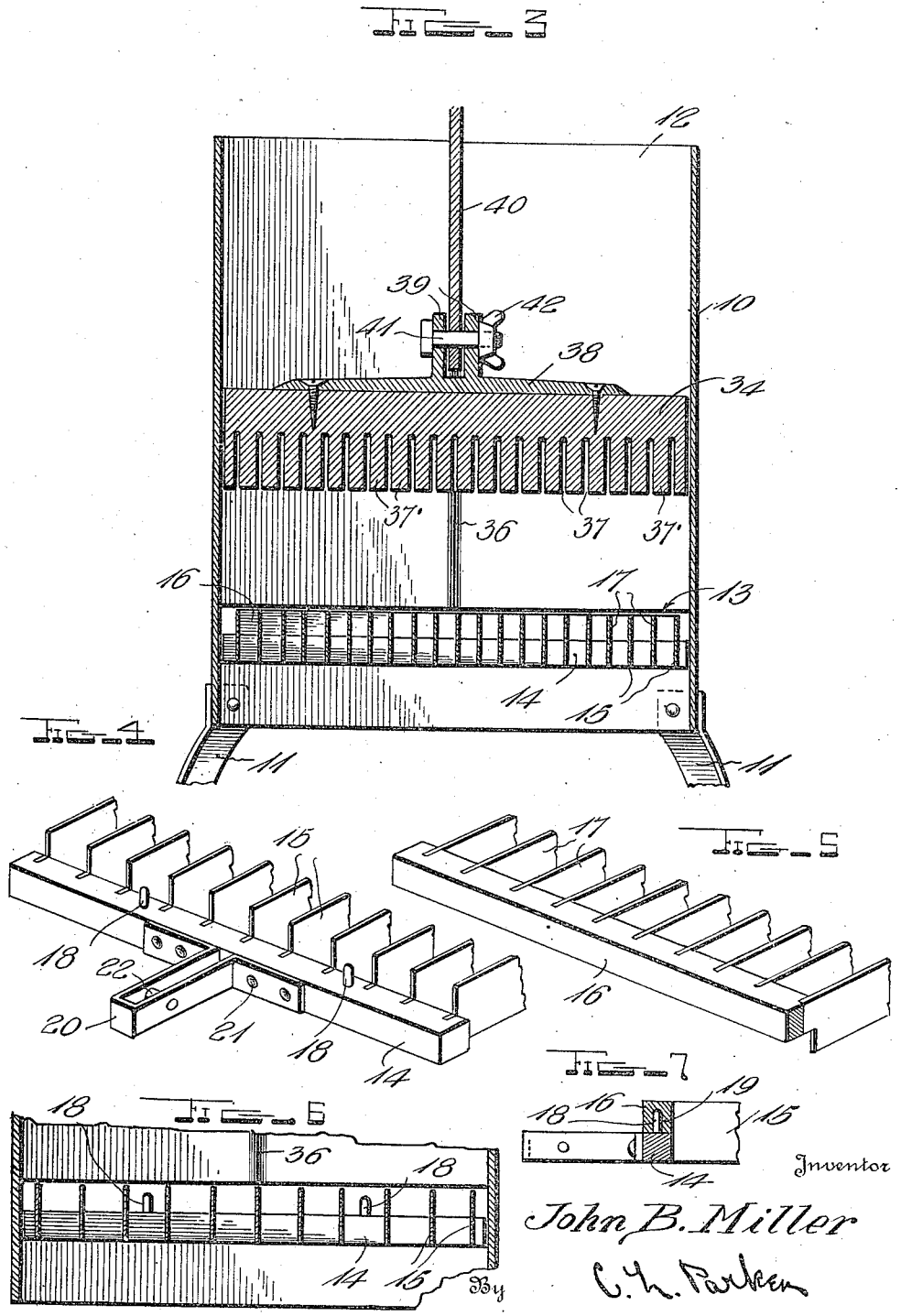
Inventor
John B. Miller
C. H. Parker
By
Attorney

UNITED STATES PATENT OFFICE.

JOHN B. MILLER, OF DETROIT, MICHIGAN.

MACHINE FOR CUTTING OR SLICING FOOD PRODUCTS.

1,296,102.  Specification of Letters Patent.  Patented Mar. 4, 1919.

Application filed May 31, 1918. Serial No. 237,531.

*To all whom it may concern:*

Be it known that I, JOHN B. MILLER, a citizen of the United States, residing at Detroit, in the county of Wayne and State of Michigan, have invented certain new and useful Improvements in Machines for Cutting or Slicing Food Products, of which the following is a specification.

My invention relates to machines for cutting or slicing food products, such as vegetables, fruits, meats, and the like.

An important object of the invention is to provide a machine of the above mentioned character, which is rapid in operation, and highly convenient in use.

A further object of the invention is to provide means whereby the cutting device may be adjusted, for cutting or slicing the food products in different sizes.

A further object of the invention is to provide means for effecting a reciprocatory movement of the cutter device, while the food products are being pressed into contact therewith, by a downward movement of a single lever.

Other objects and advantages of the invention will be apparent during the course of the following description.

Figure 1:
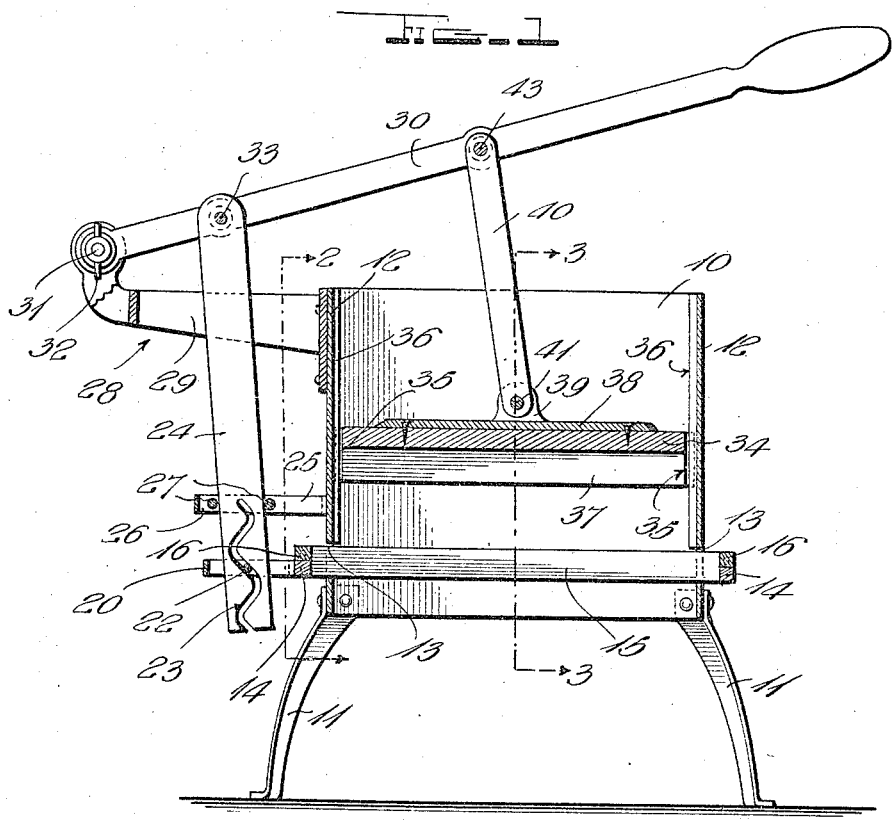
Figure 2:
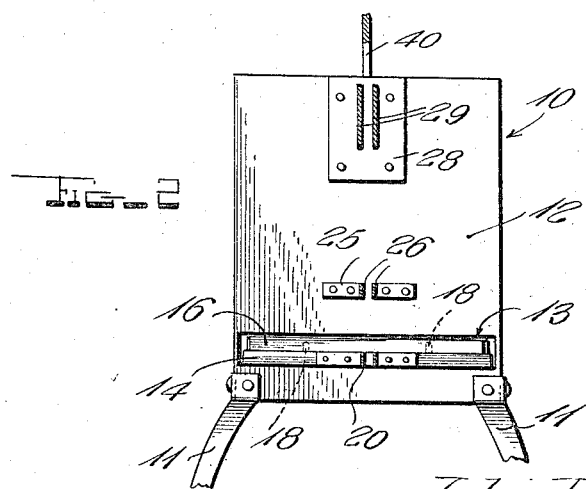

In the accompanying drawings forming a part of this specification, and in which like numerals are employed to designate like parts throughout the same, Figure 1 is a central vertical longitudinal section through apparatus embodying my invention, parts being shown in elevation, Fig. 2 is a transverse sectional view taken on line 2—2 of Fig. 1, Fig. 3 is a similar view taken on line 3—3 of Fig. 1, Fig. 4 is a fragmentary perspective view of the lower section of the cutting device, Fig. 5 is a similar view of the upper section of the cutting device, Fig. 6 is a transverse sectional view through the lower section of the cutting device, and Fig. 7 is a detail section through the transverse ends of the upper and lower sections of the cutting device, showing the interlocking means therefor.

In the drawings, wherein for the purpose of illustration is shown a preferred embodiment of my invention, the numeral 10 designates a vertical casing, which is preferably rectangular, and has its upper and lower ends open, as shown. To the lower ends of this casing, at its corners, are attached legs 11, to support the same, and retain it suitably elevated, so that a pan or the like may be inserted beneath the casing 10, to catch the food stuffs which have been cut or sliced.

The casing 10 is provided in its ends 12 and near its bottom, with horizontal transverse openings 13, for the reception of a reciprocatory cutting or slicing device, to be described. This cutting or slicing device embodies a lower section, comprising transverse end members 14, connected by longitudinal blades 15, which are arranged on edge in vertical planes, and project above the end members 14, for a substantial distance, as shown. The blades 15 are equidistantly spaced, and are arranged to cut or slice the food stuffs into the desired size or thickness. The upper section of the cutting device embodies transverse end members 16, adapted to be arranged upon the end members 14. The transverse end members 16 are connected by equidistantly spaced blades 17, which project downwardly below the same for a substantial distance. When the end members 16 are placed upon the end members 14, the blades 17 extend between the blades 15 and all of the blades are equidistantly spaced with their upper cutting edges arranged in the same horizontal plane as clearly indicated in Fig. 4. It is thus seen that by adding the upper section to the lower section of the cutting device, the food stuff will be cut smaller or thinner. The upper and lower sections are locked together by means of upstanding pins 18, rigidly secured to the transverse members 14, and entering recesses 19, formed in the transverse members 16. These sections are readily separable.

Means are provided to reciprocate the lower section and the upper section of the cutting device, when secured thereto, comprising a U-shaped yoke or bracket 20, which is rigidly attached to transverse member 14, as shown at 21. The yoke 20 carries a transverse pin 22, extending into and through a cam slot 23, formed in a vertical reciprocatory pitman 24. This pitman operates within a stationary guide bracket 25, rigidly attached to one end of the casing 10, and including sides 26. The sides have connection with transverse guide pins 27, arranged to contact with the opposite longitudinal edges of the pitman 24. It is thus apparent that means are provided to guide the pitman 24 during its reciprocatory movement, but will permit of slight lateral movement or play thereof.

Rigidly secured to the same end of the casing 10 is a lever bracket 28, embodying spaced sides 29 between which the pitman 24 operates. A lever 30 is pivoted to the bracket 28, by means of a bolt 31, carrying a thumb nut 32, as shown. The pitman 24 is pivoted to the lever 30, as shown at 33.

Arranged within the casing 10, above the reciprocatory cutting device, is a reciprocatory plunger 34, provided at its ends with grooves 35, for the reception or ribs 36, which serve to guide it in its movement. The plunger 34 is provided upon its lower side with equidistantly spaced vertical longitudinal slots or grooves 37, for receiving the blades 15 and 17, and of a sufficient depth to completely receive the same, whereby the plunger is adapted to push or discharge all of the food stuffs from between the blades. Secured to the upper side of the plunger is a head 38, having spaced upstanding knuckles 39 with a link 40 arranged therebetween. The link 40 is pivoted to the knuckles 39 by a bolt 41 or the like. This bolt carries a thumb nut 42. The link 40 is pivotally connected with the lever 30, near its center, as shown at 43.

The operation of the apparatus is as follows:

The lever 30 is elevated to remove the plunger 34 from the upper open end of the casing 10 subsequently to which the food stuff such as fruits, vegetables, or meat, is introduced into the casing 10 and is supported by the cutting device embodying the longitudinal blades. The plunger 34 is now returned into the casing 10 by a downward movement of the lever 30 and contacts with the food stuff. By exerting downward pressure upon the lever 30 it is moved downwardly and the plunger 34 presses the food stuff downwardly into contact with the cutting device, which is simultaneously reciprocated, by the action of the cam groove 23, upon the pin 22. The downward movement of the plunger is continued until the teeth 37' thereof are arranged between the blades and serve to discharge all of the food stuffs therefrom.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. Apparatus of the character described, comprising a casing, an approximately horizontal reciprocatory cutting device arranged within the lower portion of the casing, a vertically movable plunger adapted to operate within the upper portion of the casing, a vertically swinging lever pivotally connected with the casing, a link pivoted to the lever between its ends and pivoted to the plunger, a pitman pivotally connected with the lever between its ends and provided near its lower end with a cam slot, and a pin connected with the reciprocatory cutting device and operating within the cam slot.

2. In apparatus of the character described, a casing, a reciprocatory cutting device operating within the casing, said device including transverse bars and spaced blades connecting the bars, a second reciprocatory cutting device including transverse bars adapted to be arranged upon the first named transverse bars and to be secured thereto and spaced blades secured to the second named transverse bars and adapted for arrangement between the first named blades, and means for effecting a reciprocatory movement of the combined cutting devices.

3. In apparatus of the character described, a casing, a reciprocatory cutting device operating within the casing, said device including transverse bars and spaced parallel blades connected therewith and projecting above the bars, a second reciprocatory cutting device including transverse bars adapted to be arranged upon the first named transverse bars and having openings formed therein, said second cutting device further comprising spaced parallel blades secured to the second named transverse bars and projecting downwardly below the same and adapted for arrangement between the first named blades, pins secured to the first named transverse bars and adapted to enter the openings in the second named bars, a plunger mounted within the casing, and means to move the plunger and the reciprocatory cutting devices.

4. In apparatus of the character described, a casing, a reciprocatory cutting device arranged within the casing, a plunger operating within the casing to force material toward the reciprocatory cutting device, a pivoted lever having connection with the plunger to move it, a pitman connected with the lever to be moved thereby and provided with a cam slot, and a pin connected with the reciprocatory cutting device and operating within the cam slot.

5. In apparatus of the character described, a casing, a reciprocatory cutting device arranged within the casing, a plunger operating within the casing to force material toward the reciprocatory cutting device, a lever having pivotal connection with the casing, a link pivoted to the lever between the ends of the lever and having pivotal connection with the plunger, a pitman pivotally connected with the lever between the ends of the lever and provided with a cam slot, a guide for the pitman secured to the casing, and a pin connected with the reciprocatory cutting device and operating within the cam slot.

In testimony whereof I affix my signature in presence of two witnesses.

JOHN B. MILLER.

Witnesses:
HUGH MCCORMICK,
W. C. WILSON.

Copies of this patent may be obtained for five cents each, by addressing the "Commissioner of Patents, Washington, D. C."